United States Patent
Yamashita et al.

(10) Patent No.: US 7,719,763 B2
(45) Date of Patent: May 18, 2010

(54) LIGHT-DIFFUSING MEMBER, TRANSMISSION TYPE SCREEN, REAR-PROJECTION-TYPE DISPLAY, AND LIGHT-ABSORBING-PART-FORMING RESIN COMPOSITION

(75) Inventors: Yoshiyuki Yamashita, Shinjuku-Ku (JP); Nobuaki Nakao, Yokohama (JP)

(73) Assignees: Dai Nippon Printing Co., Ltd., Shinjuku-Ku (JP); The Inctec Inc., Yokohama-shi (JP)

( * ) Notice: Subject to any disclaimer, the term of this patent is extended or adjusted under 35 U.S.C. 154(b) by 348 days.

(21) Appl. No.: 11/719,367

(22) PCT Filed: Feb. 23, 2006

(86) PCT No.: PCT/JP2006/303286

§ 371 (c)(1),
(2), (4) Date: May 15, 2007

(87) PCT Pub. No.: WO2006/090784

PCT Pub. Date: Aug. 31, 2006

(65) Prior Publication Data

US 2009/0091824 A1    Apr. 9, 2009

(30) Foreign Application Priority Data

Feb. 24, 2005    (JP) .............................. 2005-048928

(51) Int. Cl.
*G03B 21/60* (2006.01)

(52) U.S. Cl. ...................................... 359/453

(58) Field of Classification Search ................. 359/460, 359/455–457, 452–453
See application file for complete search history.

(56) References Cited

U.S. PATENT DOCUMENTS 6,822,792 B2 * 11/2004 Goto .......................... 359/456
2004/0160669 A1    8/2004 Osawa et al.

FOREIGN PATENT DOCUMENTS

| JP | 11-300768 | A1 | 11/1999 |
| JP | 2003-066206 | A1 | 3/2003 |
| JP | 2003-084111 | A1 | 3/2003 |
| JP | 2004-004148 | A1 | 1/2004 |
| JP | 2004-093588 | A1 | 3/2004 |
| JP | 2004-110002 | A1 | 4/2004 |
| JP | 2004-151592 | A1 | 5/2004 |

* cited by examiner

*Primary Examiner*—Christopher Mahoney
(74) *Attorney, Agent, or Firm*—Burr & Brown

(57) ABSTRACT

The present invention provides a light-diffusing member having no non-uniformity in stripes. The light-diffusing member according to the present invention is for diffusing at least a part of transmitted light by totally reflecting the same. The light-diffusing member comprises a light-diffusing part that has a diffusing-part base having a plurality of grooves tapered down toward the incident side, formed on the light-outgoing side in juxtaposition with one another, and light-absorbing parts formed, in the grooves in the diffusing-part base, by a radiation-curing resin composition. The radiation-curing resin composition includes colored particles. The colored particles have a mean particle diameter of 3.5 μm or more and 20 μm or less.

16 Claims, 6 Drawing Sheets

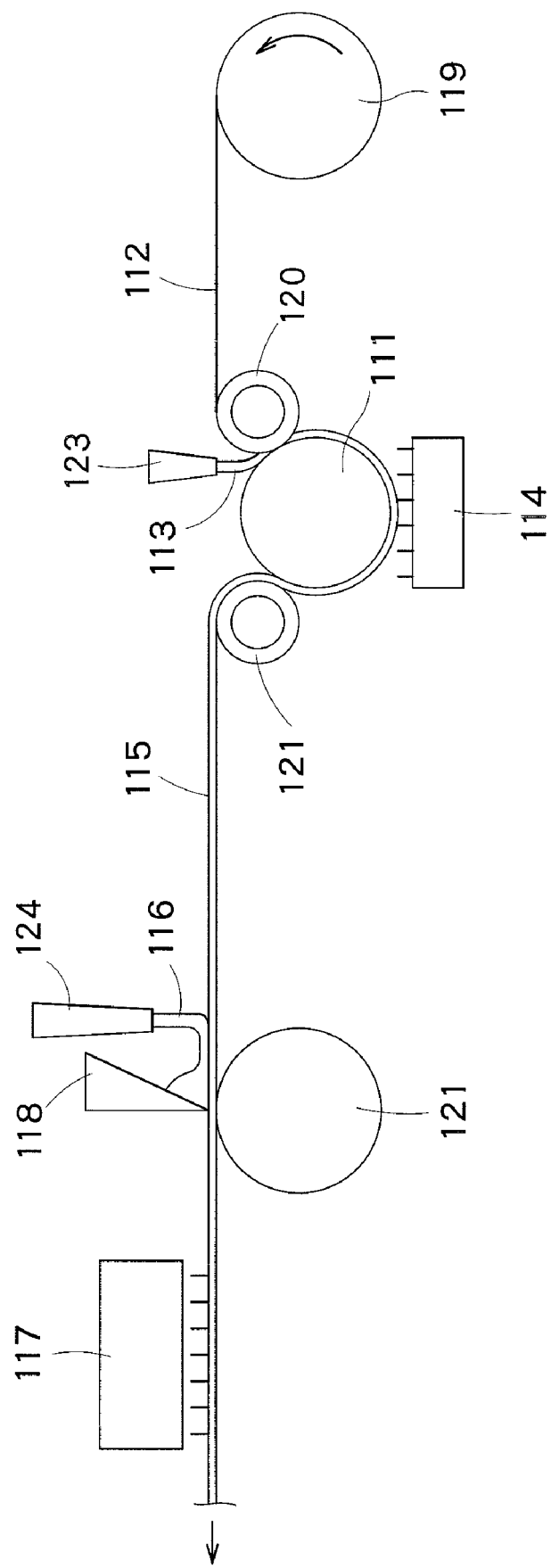
F I G. 8

LIGHT-DIFFUSING MEMBER, TRANSMISSION TYPE SCREEN, REAR-PROJECTION-TYPE DISPLAY, AND LIGHT-ABSORBING-PART-FORMING RESIN COMPOSITION

TECHNICAL FIELD

The present invention relates to a light-diffusing member having light-absorbing parts capable of absorbing stray light and the like, a transmission type screen comprising the light-diffusing member, a rear-projection-type display provided with the transmission type screen, and a light-absorbing-part-forming resin composition useful in forming the light-absorbing parts. In particular, the present invention relates to a light-diffusing member having no noticeable non-uniformity in stripes, a transmission type screen on which non-uniformity in stripes is scarcely observed, a rear-projection-type display on which non-uniformity in stripes is scarcely observed, and a light-absorbing-part-forming resin composition that causes no covering.

BACKGROUND OF THE INVENTION

Displays with large-sized screens, such as rear-projection-type displays, are required to have greater viewing angles as compared to displays with small-sized screens because it is a common manner that many people view, at the same time, the images displayed on the large-sized screens. For example, a projection television, a rear-projection-type display, has a transmission type screen (rear projection screen) on which imaging light emitted from a light source is projected. Generally, this transmission type screen comprises a Fresnel lens sheet, a lens member, for deflecting the imaging light projected from the light source so as to make it parallel or nearly parallel light (hereinafter collectively referred to as nearly parallel light), and a light-diffusing member for diffusing the nearly parallel light so as to make the viewing angle greater.

In the meantime, there has been known, as the above-described light-diffusing member, a refraction-type lenticular lens member in which cylindrical lenses extending in one direction parallel to the sheet plane of the light-diffusing member (for example, in the vertical direction when incorporated in a display) are juxtaposed in another direction nearly perpendicular to the above one direction (for example, in the horizontal direction when incorporated in a display). Another known light-diffusing member is a total-reflection-type lenticular lens member having a diffusing-part base in which a plurality of grooves extending in one direction parallel to the sheet plane of the light-diffusing member have been made so that they are juxtaposed in another direction nearly perpendicular to the above one direction, and light-absorbing parts formed by filling the grooves with a low-refractive-index material including dark-colored particles. In the total-reflection-type lenticular lens member, the diffusing-part base has, between the grooves, unit lens parts having nearly trapezoidal cross sections, and the unit lens part—light-absorbing part interface totally reflects at least a part of incident light so as to diffuse transmitted light.

For example, as described in Japanese Patent Laid-Open Publication No. 2004-4148, a lenticular lens member of the above-described total reflection type comprises a light-diffusing part having unit lens parts (lens elements) whose cross sections are nearly trapezoidal, and light-absorbing parts between the unit lens parts, having wedge-like cross sections. The upper bases of the unit lens parts form the light-outgoing surface (light-emergent surface) of the light-diffusing part, and on the light-diffusing part is formed a pattern (BS pattern) for absorbing stray light, extraneous light, and so forth, which looks like stripes in black when viewed from the light-outgoing side (light-emergent side). The light-absorbing parts constitute the black portions of the black-stripe pattern.

In parts of the light-diffusing member where the upper base and the lower base of each unit lens are seen superposed when viewed along the direction perpendicular to the sheet plane of the light-diffusing member, light vertically entering the sheet plane of the light-diffusing member is transmitted as it is and emerges from the plane of emergence. However, in the other parts, light vertically entering the sheet plane of the light-diffusing member is totally reflected from the unit lens part—light-absorbing part interface, and then the reflected light is refracted by the interface between the upper bases of the unit lens parts and a medium layer formed on the upper bases and emerges from the light-diffusing member. Further, in this total-reflection-type lenticular lens member, since an ultraviolet-curing resin composition containing dark-colored particles is used to form the light-absorbing parts, the light-absorbing parts function as black stripes and can therefore enhance the contrast of an image to be projected on a transmission type screen.

FIG. 10 is a schematic sectional view showing a lenticular lens member of total reflection type, and FIG. 8 is a flow sheet showing a process for producing the lenticular lens member. As shown in FIG. 10, a total-reflection-type lenticular lens member 101 comprises a substrate 102, a light-diffusing part 103, an adhesive layer 104, and a supporting plate 105. The light-diffusing part 103 has a diffusing-part base 103a having a large number of nearly V-shaped grooves 106 tapered down to a point toward the substrate, and light-absorbing parts 103b formed by filling the grooves 106 with an ultraviolet-curing resin composition containing colored particles. The portions between two adjacent light-absorbing parts 103b and 103b of the diffusing-part base 103a form the above-described unit lens parts 108. In the production of such a total-reflection-type lenticular lens member 101, an ultraviolet-curing resin composition 113 for forming the diffusing-part base is, as shown in FIG. 8, supplied between a forming roll 111 having, on its periphery, nearly trapezoidal concavities for making the nearly V-shaped grooves, and a substrate 112 to be fed to the forming roll 111, while rotating the forming roll 111. The ultraviolet-curing resin composition 113 is then exposed to ultraviolet light emitted from a UV lamp 114 so as to form the diffusing-part base 103a with grooves, thereby obtaining an intermediate member 115 having the diffusing-part base 103a and the substrate 112. Thereafter, this intermediate member 115 is separated from the forming roll 111, and the grooves in this member are filled with an ultraviolet-curing resin composition 116 including colored particles. The ultraviolet-curing resin composition 116 is then exposed to ultraviolet light from a UV lamp 117 so as to form the light-absorbing parts 103b, thereby obtaining the light-diffusing part 103 having the diffusing-part base 103a and the light-absorbing parts 103b. In the subsequent step not shown in the figure, a supporting plate 105 is laminated to the light-diffusing part 103 with an adhesive, thereby obtaining the light-diffusing member 101. In this production process, in order to fill the grooves in the intermediate member 115 separated from the forming roll 111 with the ultraviolet-curing resin composition 116, the resin composition is scraped off with a doctor 118 from the upper bases 109 of the unit lens parts 108 into the grooves.

However, in the above-described total-reflection-type lenticular lens member, non-uniformity in stripes brought about by covering (overlaying, overlapping, blushing, bronzing) is occasionally observed on the light-transmitting portions, i.e.

the upper bases of the unit lens parts, between the BS pattern. In more detail, in the process for producing the total-reflection-type lenticular lens member, shown in FIG. 8, when the ultraviolet-curing resin composition is scraped off with the doctor 118 from the upper bases 109 of the unit lens parts 108 into the grooves, the colored-particle-containing resin 110 that has slipped through the gaps between the doctor 118 and the light-transmitting portions between the light-absorbing parts 103b and 103b (the upper bases 109 of the unit lens parts 108) can remain on the light-transmitting portions in order to cause so-called "covering".

If the lenticular lens member on which covering has occurred is used in order to make a transmission type screen, since transmittance of light is disturbed by the colored particles remaining on the upper bases 109 of the unit lens parts 108, the covering is perceived by viewers as "non-uniformity in stripes", which is a phenomenon that the upper bases 109 of the unit lens parts 108, constituting a BS pattern, seem non-uniform in width. The lenticular lens member on which covering has occurred thus brings about non-uniformity in stripes, resulting in decrease in the product yield of lenticular lens member.

Especially in the recent rear-projection-type displays, light sources of single tube type (hereinafter referred to as "single light sources"), using LCDs (Liquid Crystal Displays) or DLP (Digital Light Processing), have come to be used in order to meet the demand for digital, high-definition, compact displays. Although such rear-projection-type displays using single light sources are advantageous in that they can more sharply display still images and letters by means of pixels display, pixel display being a characteristic feature of this type of displays, they are disadvantageous in that the above-described non-uniformity in stripes that has conventionally been not so noticeable becomes noticeable.

SUMMARY OF THE INVENTION

The present invention was accomplished in order to solve the above-described problems. A first object of the present invention is to provide a light-diffusing member having no noticeable non-uniformity in stripes. A second object of the present invention is to provide a transmission type screen on which non-uniformity in stripes is scarcely observed. A third object of the present invention is to provide a rear-projection-type display on which non-uniformity in stripes is scarcely observed. A fourth object of the present invention is to provide a light-absorbing-part-forming resin composition that hardly causes covering which brings about non-uniformity in stripes.

A light-diffusing member according to the present invention that fulfills the above-described first object is a light-diffusing member for diffusing at least a part of transmitted light by totally reflecting it, comprising a light-diffusing part that has a diffusing-part base having a plurality of grooves formed on the light-outgoing side and tapered down toward the incident side, and light-absorbing parts formed, in the grooves in the diffusing-part base, by a radiation-curing resin composition wherein the radiation-curing resin composition includes colored particles, and the colored particles have a mean particle diameter of 3.5 µm or more and 20 µm or less.

According to such a light-diffusing member of the present invention, since colored particles having a mean particle diameter of 3.5 µm or more are used as the colored particles, the occurrence of covering can be minimized, because, when the radiation-curing resin composition including the colored particles is scraped off with a doctor, the colored particles hardly slip through the gap between the doctor and the light-diffusing part. Therefore, by using this light-diffusing member as a component part of a transmission type screen, it is possible to significantly reduce non-uniformity in stripes to be observed on the transmission type screen. The light-diffusing member can be favorably used especially in a rear-projection-type display using a single light source, capable of sharply displaying still images and letters.

In the light-diffusing member according to the present invention, it is preferred that the ratio of colored particles with particle diameters of 3.0 µm or less included in the radiation-curing resin composition relative to the radiation-curing resin composition be 7.0% by weight or less. According to such a light-diffusing member of the present invention, since the ratio, in the radiation-curing resin composition, of small colored particles with particle diameters of 3.0 µm or less that slip easily through the gap between a doctor and the light-diffusing part when the radiation-curing resin composition containing the colored particles is scraped off with the doctor is made 7.0% by weight or less, the occurrence of covering can be significantly reduced.

Further, in the light-diffusing member according to the present invention, it is preferred that the colored particles be acrylic or urethane crosslinkable fine particles containing carbon black.

Furthermore, in the light-diffusing member according to the present invention, it is preferred that the viscosity of the radiation-curing resin composition at 25° C. be 500 mPa·s or more and 100,000 mPa·s or less.

Furthermore, it is preferred that the light-diffusing member according to the present invention further comprises a substrate placed on the incident side of the light-diffusing part.

Furthermore, it is preferred that the light-diffusing member according to the present invention further comprises a supporting plate laminated to the light-diffusing part.

A transmission type screen according to the present invention that fulfills the above-described second object comprises any of the above-described light-diffusing members according to the present invention.

According to the transmission type screen of the present invention, since the above-described light-diffusing member on which covering hardly occurs is used as a component part of the transmission type screen, it is possible to reduce non-uniformity in stripes to be observed on the transmission type screen. The transmission type screen, therefore, can be favorably used especially in a rear-projection-type display using a single light source, capable of sharply displaying still images and letters.

The transmission type screen according to the present invention may further comprise a refraction-type Fresnel lens member placed so that it faces the substrate of the light-diffusing member. Alternatively, the transmission type screen according to the present invention may further comprise a total-reflection-type Fresnel lens member placed so that it faces the substrate of the light-diffusing member, or bonded to the substrate of the light-diffusing member.

A rear-projection-type display according to the present invention that fulfills the above-described third object comprises any one of the above-described transmission type screens according to the present invention.

According to the rear-projection-type display of the present invention, since the display is provided with the transmission type screen comprising the above-described light-diffusing member on which covering hardly occurs, it is possible to reduce non-uniformity in stripes to be observed on the display. The rear-projection-type display is thus suited for use with a single light source with which a display can sharply display still images and letters.

A light-absorbing-part-forming resin composition according to the present invention that fulfills the above-described fourth object is a radiation-curing resin composition to be applied to a member in a sheet form, having a plurality of grooves, and scraped off with a doctor into the grooves so as to form therein light-absorbing parts, the resin composition comprising colored particles with a mean particle diameter of 3.5 µm or more and 20 µm or less.

According to the light-absorbing-part-forming resin composition of the present invention, since colored particles with a mean particle diameter of 3.5 µm or more are used, the occurrence of covering on the member in a sheet form can be minimized because such colored particles hardly slip through the gap between the doctor and the member in a sheet form.

In the light-absorbing-part-forming resin composition according to the present invention, it is preferred that the ratio of colored particles with a mean particle diameter of 3.0 µm or less in the whole composition relative to the whole composition be 7.0% by weight or less. According to such a light-absorbing-part-forming resin composition of the present invention, since the ratio of colored particles with small particle sizes in the resin composition is made low, the occurrence of covering on the member in a sheet form can be minimized because such colored particles hardly slip through the gap between the doctor and the member in a sheet form.

Further, in the light-absorbing-part-forming resin composition according to the present invention, it is preferred that the colored particles be acrylic or urethane crosslinkable fine particles containing carbon black.

Furthermore, it is preferred that the viscosity, at 25° C., of the light-absorbing-part-forming resin composition according to the present invention be 500 mPa·s or more and 100,000 mPa·s or less.

BRIEF DESCRIPTION OF THE DRAWINGS

FIG. 8 is a flow sheet showing one example of a process for producing a total-reflection-type lenticular lens member (light-diffusing member).

DETAILED DESCRIPTION OF THE INVENTION

Embodiments of a light-diffusing member, a transmission type screen, a rear-projection-type display, and a light-absorbing-part-forming resin composition according to the present invention will be described hereinafter with reference to the accompanying drawings. However, the following embodiments should not be read as limiting the scope of the present invention.

(Light-Diffusing Member)

Figure 1:
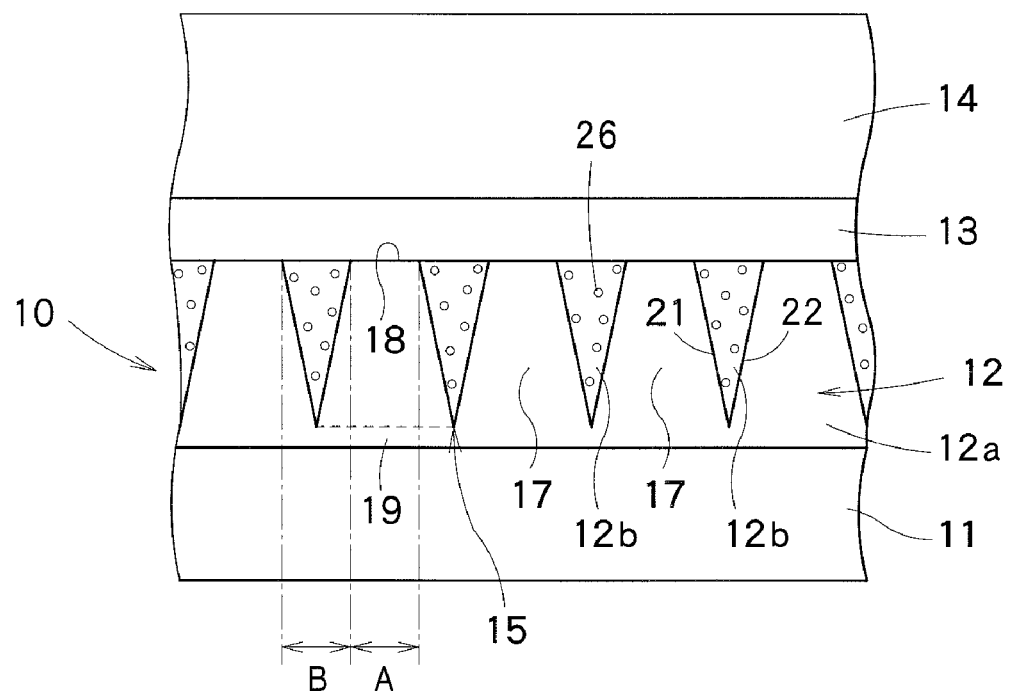
FIG. 1 is a schematic sectional view showing one embodiment of a light-diffusing member according to the present invention.
Figure 2:
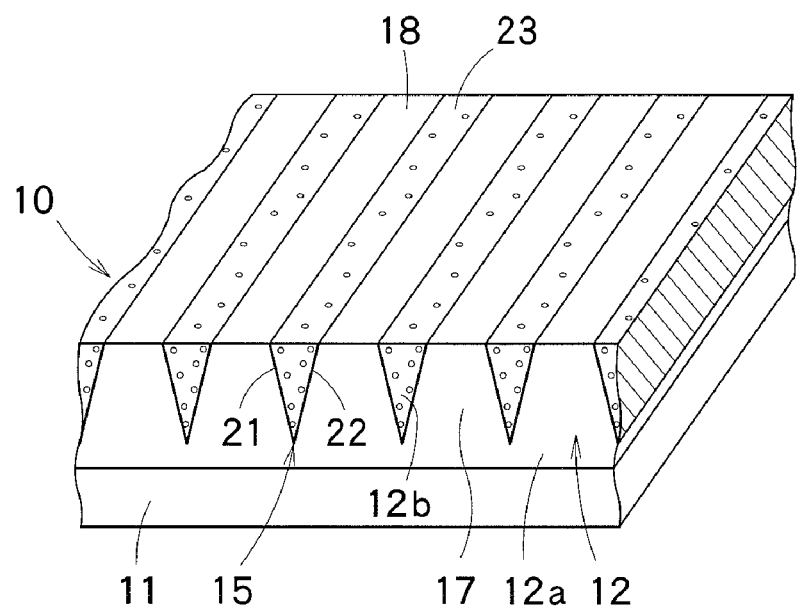
FIG. 2 is a perspective view of the light-diffusing member shown in FIG. 1, showing its light-diffusing part and its substrate.

FIG. 1 is a schematic sectional view showing an embodiment of a light-diffusing member according to the present invention, and FIG. 2 is a perspective view of the light-diffusing member, showing its light-diffusing part and substrate.

A light-diffusing member 10 of this embodiment comprises a substrate 11, and, on the substrate 11, a light-diffusing part 12 for diffusing at least a part of light incident on the substrate side thereof by totally reflecting the same. In this embodiment, a supporting plate 14 is laminated, as shown in FIG. 1, to the light-diffusing part 12 through an adhesive layer 13. As shown in FIG. 2, the light-diffusing part 12 has a diffusing-part base 12a in which a plurality of grooves 15 extending in one direction parallel to the sheet plane of the light-diffusing member 10 (for example, in the vertical direction when incorporated in a display) have been made so that they are juxtaposed in another direction nearly perpendicular to the above one direction (for example, in the horizontal direction when incorporated in a display), and light-absorbing parts 12b formed in the grooves 15. In this embodiment, the grooves 15 have, as shown in FIG. 2, nearly V-shaped cross-sections tapered down to a point toward the substrate 11. Further, the light-absorbing parts 12b are made from a radiation-curing resin composition including colored particles 26. The characteristic feature of the present invention is that the mean particle diameter of the colored particles 26 is 3.5 µm or more and 20 µm or less. The colored particles are omitted from the drawings except FIG. 1.

The diffusing-part base 12a of the light-diffusing part 12, having the above structure, according to the present invention includes those parts whose sections taken perpendicularly to the longer direction of the grooves 15 are nearly trapezoidal (referred to as "unit lens parts 17" in this application). In this light-diffusing part 12, the upper bases 18 of the nearly trapezoidal unit lens parts 17 form the light-outgoing-side surface (light-exiting-side surface, light-emergent-side surface) of the light-diffusing part 12, and the light-absorbing parts 12b form black stripes 23. In parts A in which the upper bases 18 and the lower bases 19 of the unit lens parts 17 are seen superposed when viewed from the direction perpendicular to the sheet plane of the light-diffusing part 12, light entering the light-diffusing part 12 perpendicularly to its sheet plane passes through the light-diffusing part 12 as it is and emerges from the light-diffusing part 12. However, in the other parts B, light entering the light-diffusing part 12 perpendicularly to its sheet plane is totally reflected on the interface between the unit lens part 17 and light-absorbing part 12b. The reflected light is refracted by the interface between the upper bases 18 of the unit lens parts 17 and the adhesive layer 13 formed on the upper bases 18, and then emerges from the light-diffusing part 12. In this light-diffusing member 10, since the light-absorbing parts 12b are formed by a radiation-curing resin composition including the colored particles 26, they function as black stripes 23 and have the effect of enhancing the contrast of an image to be projected on a transmission type screen. The components of the light-diffusing member of the present invention will be described below in detail.

(Substrate)

The substrate 11 is a transparent member in a film or sheet form, and a polyethylene terephthalate film, a polycarbonate film, or the like is used as the substrate 11.

(Light-Diffusing Part)

The light-diffusing part 12 is a member to be formed on the substrate 11, and has, as shown in FIG. 1, a diffusing-part base 12a having a plurality of grooves tapered down to a point toward the incident side (the entrance side), made on the light-outgoing side (the light exit side) in juxtaposition with one another, and low-refractive-index light-absorbing parts 12b formed in the grooves 15 by filling the grooves 15 with a low-refractive-index radiation-curing resin composition including the colored particles 26.

The diffusing-part base 12a of this light-diffusing part 12 is made from a high-refractive-index resin composition. The diffusing-part base 12a has, between two adjacent light-absorbing parts 12b and 12b, unit lens parts 17 having nearly trapezoidal cross-sections. As shown in FIG. 2, each unit lens part 17 extends in parallel with the longer direction of the light-absorbing part 12b, and a plurality of the unit lens parts 17 are juxtaposed in the direction perpendicular to the longer direction of the light-absorbing parts 12b.

As shown in FIG. 1, a first slant 21 and a second slant 22, that is to say, the low-refractive-index light-absorbing part 12b—high-refractive-index unit lens part 17 interfaces form outer contour of the wedge-shaped light-absorbing part 12b. These slants 21, 22 function as a light guide in such a way that, of the light deflected, for example, by a Fresnel lens member (see FIGS. 4 and 5) to nearly parallel, the light that has reached the slants 21, 22 is totally reflected. Further, the light-absorbing parts 12b are formed by a low-refractive-index radiation-curing resin composition including the colored particles 26, and act so as to absorb not only stray light that has entered the light-diffusing member 10 or has been produced in the light-diffusing member 10 but also extraneous light that has entered the light-diffusing member 10, thereby increasing contrast.

The wedge-shaped light-absorbing parts 12b and the nearly trapezoidal unit lens parts 17 that constitute the light-diffusing part 12 tend to be made with fine pitches so as to meet the recent single light sources. Therefore, a radiation-curing resin composition from which lenses can be made with a fine pitch is used as the material for the unit lens parts 17. Specifically, a radiation-curing resin composition prepared by incorporating, in a radiation-curing prepolymer, a radiation-curing monomer serving as a reactive diluent and a photopolymerization initiator is preferably used. Urethane (meth)acrylate, polyester (meth)acrylate, or epoxy (meth)acrylate is preferably used as the radiation-curing prepolymer. A radiation-curing resin composition having a refractive index higher than that of the radiation-curing resin composition for forming the light-absorbing parts 12b is selected for the radiation-curing resin composition for forming the unit lens parts 17. For example, a radiation-curing epoxy acrylate resin composition having a refractive index of 1.56 is preferably used.

The light-absorbing parts 12b are formed by a radiation-curing resin composition including the colored particles 26. For this radiation-curing resin composition for forming the light-absorbing parts 12b is selected a radiation-curing resin composition prepared so that its refractive index (e.g., 1.49) is lower than that of the radiation-curing resin composition for forming the unit lens parts 17.

The radiation-curing resin composition is a composition that causes polymerization reaction when exposed to ionizing radiation such as ultraviolet rays or electron beams, and its main components are a photopolymerizable prepolymer (oligomer), a photopolymerizable diluent (monomer), and a photopolymerization initiator. Additives such as sensitizers for promoting polymerization reaction, coloring pigments, and fillers may be added to this resin composition, as needed. Examples of irradiation systems useful in curing the radiation-curing resin composition include air- or water-cooling-type high-pressure mercury vapor lamps, metal halide lamps, and electron beam irradiation systems.

Examples of the photopolymerizable prepolymer include urethane (meth)acrylate, polyester (meth)acrylate, epoxy (meth)acrylate, and butadiene (meth)acrylate. Examples of the photopolymerizable diluent include monofunctional monomers, for example, vinyl monomers such as N-vinylpyrrolidone, N-vinylcaprolactam, vinylimidazole, vinylpyridine, and styrene, (meth)acrylate monomers such as lauryl (meth)acrylate, stearyl (meth)acrylate, butoxyethyl (meth)acrylate, ethoxydiethylene glycol (meth)acrylate, methoxytriethylene glycol (meth)acrylate, methoxypolyethylene glycol (meth)acrylate, methoxydipropylene glycol (meth)acrylate, paracumylphenoxyethyl (meth)acrylate, nonylphenoxypolyethylene glycol (meth)acrylate, tetrahydrofurfuryl (meth)acrylate, isobornyl (meth)acrylate, cyclohexyl (meth)acrylate, benzyl methacrylate, N,N-dimethyl (meth)acrylamide, N,N-dimethylaminopropyl (meth)acrylate, and acryloyl morpholine, and (meth)acrylamide derivatives; and polyfunctional monomers, for example, ethylene glycol di(meth)acrylate, diethylene glycol di(meth)acrylate, triethylene glycol di(meth)acrylate, polyethylene glycol di(meth)acrylate, tripropylene glycol di(meth)acrylate, polytetramethylene glycol di(meth)acrylate, 1,4-butanediol di(meth)acrylate, 1,6-hexanediol di(meth)acrylate, 1,9-nonanediol di(meth)acrylate, 3-methyl-1,5-pentanediol di(meth)acrylate, neopentyl glycol di(meth)acrylate, dimethylol-tricyclodecane di(meth)acrylate, hydroxypivalic acid neopentyl glycol di(meth)acrylate, bisphenol A polypropoxydiol di(meth)acrylate, trimethylol propane tri(meth)acrylate, ethoxylated trimethylol propane tri(meth)acrylate, propoxylated trimethylol propane tri(meth)acrylate, pentaerythritol tri(meth)acrylate, glyceryl tri(meth)acrylate, propoxylated glyceryl tri(meth)acrylate, tris(2-hydroxyethyl)isocyanurate triacrylate, pentaerythritol tetra(meth)acrylate, ditrimethylolpropane tetra (meth)acrylate, dipentaerythritol penta(meth)acrylate, and dipentaerythritol hexa(meth)acrylate. Examples of the photopolymerization initiator include 1-hydroxycyclohexyl phenyl ketone, 2-hydroxy-2-methyl-1-phenylpropan-1-one, 2,2-dimethoxy-1,2-diphenylethan-1-one, 2,4,6-trimethylbenzoyldiphenylphosphine oxide, and phenyl bis(2,4,6-trimethylbenzoyl)-phosphine oxide. The above photopolymerizable prepolymers, photopolymerizable diluents, or photopolymerization initiators may be used either singly or as any combination of two or more of the enumerated compounds.

Specifically, as will be described later in Examples, a radiation-curing resin composition is prepared by mixing urethane acrylate, epoxy acrylate, tripropylene glycol diacrylate, and methoxytriethylene glycol acrylate, which are photopolymerizable components (specifically, photopolymerizable prepolymers and diluents), in a ratio determined with consideration for the above-described refractive index, viscosity, film properties, and so forth. Further, 1-hydroxycyclohexyl phenyl ketone, phenyl bis(2,4,6-trimethylbenzoyl)-phosphine oxide, or the like is useful herein as the photopolymerization initiator, and a proper compound is selected for the photopolymerization initiator with consideration for the irradiation system to be used so as to cure the radiation-curing resin composition and for the hardenability of the radiation-curing resin composition. From the viewpoint of hardenability and cost, it is preferred that the photopolymerizable components and the photopolymerization initiator be mixed in a ratio of (100:0.5) to (100:10). Such additives as silicone, anti-foaming agents, leveling agents, and solvents may be added to the radiation-curing resin composition.

The colored particles 26 are contained in the radiation-curing resin composition for forming the light-absorbing parts 12b. The colored particles 26 act so as to absorb stray light and extraneous light.

Light-absorbing colored particles such as carbon black are preferably used as the colored particles 26, but the colored particles 26 are not limited to them. Colored particles capable of selectively absorbing light of specific wavelengths may be used, depending on the characteristics of imaging light. Specifically, the colored particles useful herein include carbon black; graphite; metallic salts such as black iron oxide; organic fine particles colored with dyes, pigments, or the like; and colored glass beads. From the viewpoint of cost, quality, and obtainability, it is particularly preferable to use colored organic fine particles, more specifically, acrylic or urethane crosslinkable fine particles containing carbon black, or the like. Such colored particles 26 are incorporated in the above-described radiation-curing resin composition in an amount of 3% by weight or more and 30% by weight or less of the composition. The viscosity that will be described later and the desired concentration are taken into account in the determination of the most suitable content, within the above-described range, of the colored particles 26 in the resin composition.

In the present invention, colored particles 26 having a mean particle diameter of 3.5 μm or more and 20 μm or less are used. Since the colored particles 26 having a mean particle diameter of 3.5 μm or more are used, the occurrence of covering (overlapping, blushing, bronzing) can be minimized because, when the radiation-curing resin composition containing the colored particles 26 is scraped off with a doctor from the upper bases 18 of the diffusing-part base 12a into the grooves 15 in the diffusing-part base 12a, the colored particles 26 hardly slip through the gap between the doctor and the upper bases 18 of the diffusing-part base 12a.

On the other hand, when the colored particles has a mean particle diameter of less than 3.5 μm, the resin 110 containing the colored particles that have slipped through the gap between a doctor 118 and the light-transmitting portions between the light-absorbing parts 103b and 103b (the upper bases 109 of the unit lens parts 108) can remain on the light-transmitting portions so as to cause so-called "covering".

Although the mean particle diameter of the colored particles 26 has no upper limit, colored particles with a mean particle diameter of generally not more than 20 μm, more preferably not more than 10 μm, are used so that the colored particles 26 can arrive at every corner within all over the grooves 15, in which the light-absorbing parts 12b will be formed. However, if the grooves are made in the light-diffusing part 12 with a fine pitch and the groove width corresponding to the base of the triangular light-absorbing part 12b is made smaller, it is preferred that the upper limit of the mean particle diameter of the colored particles 26 be not more than a half of the length of the base of the triangular light-absorbing part 12b.

It is preferred that the ratio, relative to the whole radiation-curing resin composition, of colored particles 26 having particle diameters of 3.0 μm or less in the whole radiation-curing resin composition for forming the light-absorbing parts 12b, consisting of the above-described colored particles 26, radiation-curing resin, and photopolymerization initiator, and others be 7.0% by weight or less. In this case, the amount of small colored particles 26 with particle diameters of 3.0 μm or less that slip relatively easily through the gap between a doctor and the upper bases 18 of the diffusing-part base 12a when the radiation-curing resin composition containing the colored particles 26 is scraped off with the doctor from the upper bases 18 of the diffusing-part base 12a into the grooves 15 in the diffusing-part base 12a is limited. Therefore, the occurrence of such a degree of covering that recognizable non-uniformity in stripes is brought about can be significantly reduced.

When the ration, relative to the whole radiation-curing resin composition, of colored particles 26 with particle diameters of 3.0 μm or less included in the whole radiation-curing resin composition containing the colored particles 26 exceeds 7.0% by weight, since the number of the colored particles that slip through the gap between the doctor and the upper bases of the diffusing-part base 12a becomes greater, such a degree of covering that non-uniformity in stripes is brought about can occur. The reason why we have drawn a line between particle sizes of 3.0 μm or less and those of more than 3.0 μm is based on our finding that the content of colored particles with particle diameters of 3.0 μm or less in the resin composition greatly affects the occurrence of such a degree of covering that non-uniformity in stripes is brought about. The content of the colored particles with particle diameters of 3.0 μm or less in the whole resin composition for forming the light-absorbing parts 12b has no lower limit, and, as long as this content is 7.0% by weight or less, even a case where such colored particles with particle diameters of 3.0 μm or less are not included in the resin composition at all is acceptable, for example.

In the present invention, the mean particle diameter and the particle diameter of the colored particles are those of primary particles. Primary particles refer to particles that cannot be divided any more by a chemical or physical method, and are different from secondary particles that are agglomerates. Further, in the present invention, the volume-average diameter measured by a laser diffraction/scattering type particle size distribution meter manufactured by Horiba Ltd., Japan (Model: LA-910) was adopted as the mean particle diameter.

The viscosity, at 25° C., of the radiation-curing resin composition containing such colored particles 26 is preferably in the range of 500 mPa·s or more and 100,000 mPa·s or less. By so controlling the viscosity of the radiation-curing resin composition, the grooves 15 in which the light-absorbing parts 12b will be formed can be readily filled with the resin composition. When the viscosity, at 25° C., of the radiation-curing resin composition is less than 500 mPa·s, which is too low for the resin composition, there may be a case where the grooves 15 are not filled fully with the resin composition. Moreover, when such a resin composition containing the colored particles is scraped off with a doctor, the bank of the resin composition that stays before the doctor gets unstable, and it becomes difficult to control of the supply of the composition, and so forth. On the other hand, when the viscosity, at 25° C., of the radiation-curing resin composition is more than 100,000 mPa·s, which is too high for the resin composition, there may be a case where the grooves 15 are not filled fully to their bottoms (the end points of the tapered grooves) with the composition. Moreover, since such a colored-particle-containing composition itself is poor in fluidity, it is difficult to stably produce the composition.

The more preferred range of the viscosity of the resin composition at 25° C. is 3,000 mPa·s or more and 15,000 mPa·s or less, and it is easier to fill the grooves 15 with the resin composition whose viscosity is in this range. In the present invention, the viscosity was measured by the rotational viscometer method specified in JIS K-5400. Specifically, the viscosity of a composition was determined in the following manner: in a composition placed in a BL-type viscometer manufactured by Tokyo Keiki Kabushiki Kaisha, Japan, a rotor No. 4 is rotated at 12 rpm at 25° C.; after 1 minute, the value the viscometer indicates is read and is multiplied by the conversion multiplier (500, under these conditions), thereby obtaining the viscosity.

(Adhesive Layer)

The adhesive layer 13 is formed, for example, by applying an adhesive-layer-forming resin composition to the light-diffusing part 12. This layer acts so as to bond the light-diffusing part 12 and the supporting plate 14 together. A variety of resin compositions can be used as the resin composition for forming the adhesive layer 13. Specifically, it is preferable to use radiation-curing resin compositions, and examples of radiation-curing resin compositions useful herein include resin compositions containing urethane (meth) acrylate prepolymers.

A coloring agent may be incorporated in the adhesive layer 13. An adhesive layer containing a coloring agent can make covering less noticeable even if covering has slightly occurred, for example, and, therefore, hardly brings about non-uniformity in stripes. Carbon black, black pigments, black dyes, and so forth may be preferably used as the coloring agent.

(Supporting Plate)

The supporting plate 14 is a rigid sheet member so as to be placed on the adhesive layer 13 and is favorably used to back the above-described light-diffusing part 12. Generally, an acrylic resin sheet, an MS (methacryl-styrene copolymer) resin sheet, a polycarbonate resin sheet, or the like, having a thickness of 0.5 to 5.0 mm, may be preferably used as the supporting plate 14.

The supporting plate 14 may contain a coloring agent. The same coloring agent as the one that is incorporated in the above-described adhesive layer 13 may be used. Improvement in image contrast may be achieved by this supporting plate 14 in combination with the adhesive layer 13. In view of this point, if a coloring agent is incorporated in both the supporting plate 14 and the adhesive layer 13, the concentration of the coloring agent in the supporting plate 14 and that of the coloring agent in the adhesive layer 13 are controlled properly.

(Other Components)

The structure of the essential part of the light-diffusing member 10 according to the present invention has been described above. The light-diffusing member 10 according to the present invention may additionally have the following optional components.

To the light-diffusing member 10 of this embodiment may be added a light-diffusing agent for controlling the light-diffusing properties of the light-diffusing member 10. Specifically, a light-diffusing agent may be incorporated in one member, or two or more members, selected from the unit lens parts 17, the adhesive layer 13, and the supporting plate 14. The light-diffusing agent may be conventional one for use in an optical sheet, such as light-diffusing fine particles. Examples of light-diffusing agents useful herein include organic fine particles such as styrene resin fine particles, silicone resin fine particles, acrylic resin fine particles, and MS resin (methacryl-styrene copolymer resin) fine particles; and inorganic fine particles such as barium sulfate fine particles, glass fine particles, aluminum hydroxide fine particles, calcium carbonate fine particles, silica (silicon dioxide) fine particles, titanium oxide fine particles, and glass beads. One type of, or two or more types of, these materials may be incorporated in a resin.

One layer, or two or more layers, selected from such functional layers as antireflection layers, low-reflection layers, hard coat layers, antistatic layers, anti-glaring layers, anti-staining layers, polarization filter layers, and electromagnetic wave shielding layers may be formed, as needed, on the observer-side (light-outgoing-side) surface of the light-diffusing member 10 of this embodiment, that is to say, on the observer-side surface of the supporting plate 14. Further, the resistance to reflection or glaring may be conferred on the light-diffusing member by controlling the surface roughness of the observer-side surface of the supporting plate 14. The supporting plate 14 provided with such a functional layer or surface serves as a front panel that is placed on the observer-side outermost surface of a projection television.

Figure 3:
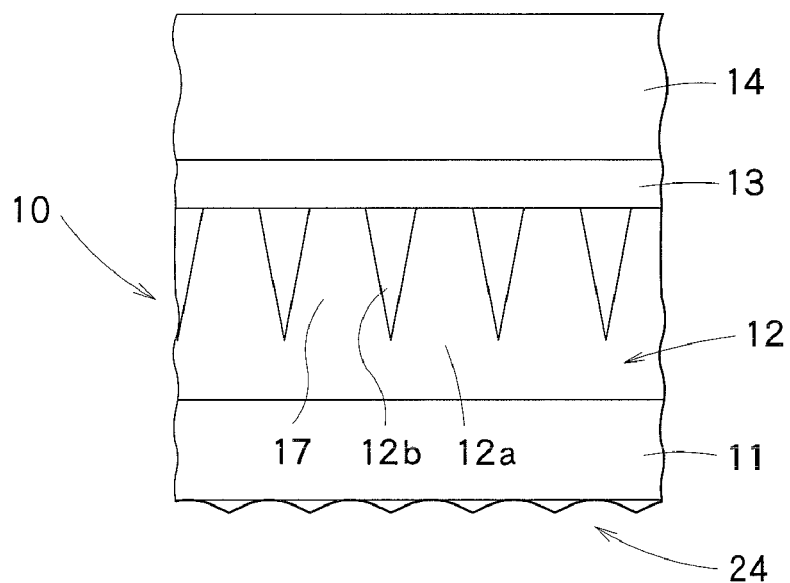
FIG. 3 is a schematic sectional view showing a modification of the light-diffusing member.

Furthermore, irregularities may be made on the light-source-side surface of the light-diffusing member of this embodiment, that is to say, on the light-source-side surface of the substrate 11. Examples of the irregularities include corrugation provided by such an optical element 24 as is shown in FIG. 3. This optical element 24 has a corrugated contour and is placed on the light-source-side surface of the substrate 11. The optical member 24 refracts light entering the substrate 11 from the light-source side (i.e., incident side). The refracted light passes through the unit lens part 17 by following an optical path different from the one the parallel light travelling in the direction perpendicular to the sheet plane of the light-diffusing member 10 follows, and a part of this light is totally reflected from the plane of total reflection and emerges from the plane of emergence. For this reason, compared to the light-diffusing member 10 having no optical element 24, the light-diffusing member 10 shown in FIG. 3 has a wider distribution of angle of light that emerges from the light-diffusing member 10 toward the observer side (light-outgoing side), so that it can be favorably used as a component part of a transmission type screen of wide viewing angle type. The embodiment of the optical element 24 is not limited to the one shown in FIG. 3, and conventional optical elements having the similar actions and effects are useful in the present invention.

As mentioned above, according to the light-diffusing member 10 of this embodiment, colored particles with a mean particle diameter of 3.5 μm or more are used as the colored particles 26, the occurrence of covering can be minimized because, when a radiation-curing resin composition containing the colored particles 26 is scraped off with a doctor from the upper bases 18 of the diffusing-part base 12a into the grooves 15 in the diffusing-part base 12a, the colored particles 26 hardly slip through the gap between the doctor and the upper bases 18 of the diffusing-part base 12a. Therefore, by using this light-diffusing member 10 as a component part of a transmission type screen 40, it is possible to significantly reduce non-uniformity in stripes to be observed on the transmission type screen 40. The light-diffusing member 10 can thus be favorably used especially in a rear-projection-type display 60 using a single light source, capable of sharply displaying still images and letters.

Furthermore, according to the light-absorbing-part-forming resin composition of this embodiment, it is possible to prevent, to a significant extent, slipping of the colored particles 26 through the gap between a member in a sheet form (for example, the diffusing-part base 12a), on which the light-absorbing-part-forming resin composition is supported, and a doctor that is used to scrape off the light-absorbing-part-forming resin composition. The occurrence of covering on the member in a sheet form can thus be significantly reduced.

<Process for Producing Light-Diffusing Member>

Next, a process for producing the above-described light-diffusing member 10 of this embodiment will be described. FIG. 8 is a flow sheet showing an example of the process for producing the above-described light-diffusing member of this embodiment.

First, a substrate 112 is fed to a forming roll 111 having, on its periphery, a groove 15 for forming configuration, while rotating the forming roll 111. At the same time, a unit-lens-part-forming radiation-curing resin composition 113 is supplied, from a supply unit 123, between the forming roll 111 and the substrate 112 running along the periphery of the forming roll 111. Thereafter, ultraviolet light from such a radiation source as a UV lamp 114 is applied (radiated) to the radiation-curing resin composition 113 so as to cure the composition. AS a result of this, unit lens parts 17 are formed from the unit-lens-part-forming radiation-curing resin composition 113. Then, the cured radiation-curing resin composition 113 is separated from the forming roll 111. Thus, there is obtained an intermediate member 115 composed of a diffusing-part base 12a having the unit lens parts 17 and the substrate 112 supporting the diffusing-part base 12a. Subsequently, a radiation-curing resin composition 116 including colored particles 26 is supplied from a supply unit 124 onto the intermediate member 115, and the grooves 15 between two adjacent unit lens parts 17 and 17 in the intermediate member 115 are filled with this composition. The radiation-curing resin composition 116 is then cured by exposing it to ultraviolet light radiated from such a radiation source as a UV lamp 117 so as to form light-absorbing parts 12b. In this process, filling of the grooves 15 in the intermediate member 115 with the radiation-curing resin composition 116 including colored particles 26 is conducted by scraping the resin composition 116 off with a doctor 118 from the upper bases 18 of the unit lens parts 17 into the grooves 15. Thus, the light-diffusing part 12 in a sheet form, having the diffusing-part base 12a and the light-absorbing parts 12b, is formed on the substrate 112. Further, although not shown in FIG. 8, a supporting plate 14 is laminated to the light-diffusing part 12 with an adhesive layer 13, and this laminate is cut into the desired size, thereby obtaining a light-diffusing member 10 of this embodiment.

In FIG. 8, reference numeral 119 designates a roll of the substrate film or sheet. Reference numeral 120 designates a nip roll for pressing, against the forming roll face, the unit-lens-part-forming radiation-curing resin composition 113. Reference numeral 121 designates a separating roll for separating the intermediate member 115 having the hardened unit lens parts. Reference numeral 122 designates a backing-up roll for efficiently removing the excess resin composition with the doctor 118.

<Transmission Type Screen>

Figure 4:
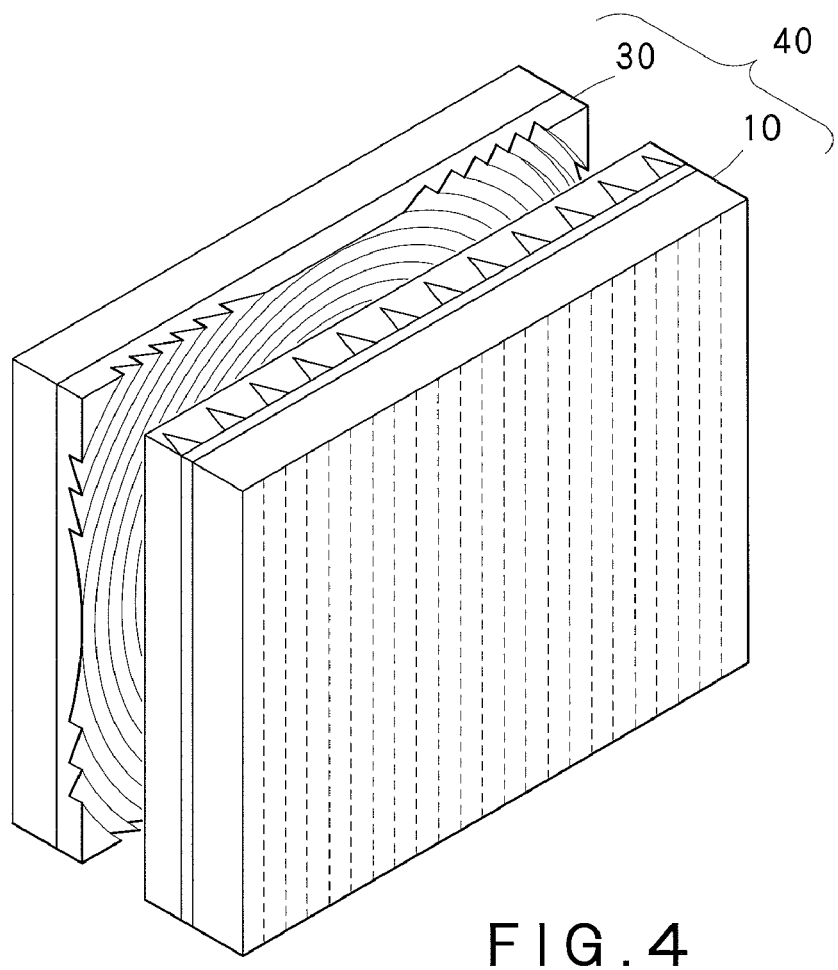
FIG. 4 is a schematic perspective view showing a transmission type screen comprising the light-diffusing member shown in FIG. 1, one embodiment of a transmission type screen according to the present invention.
Figure 5:
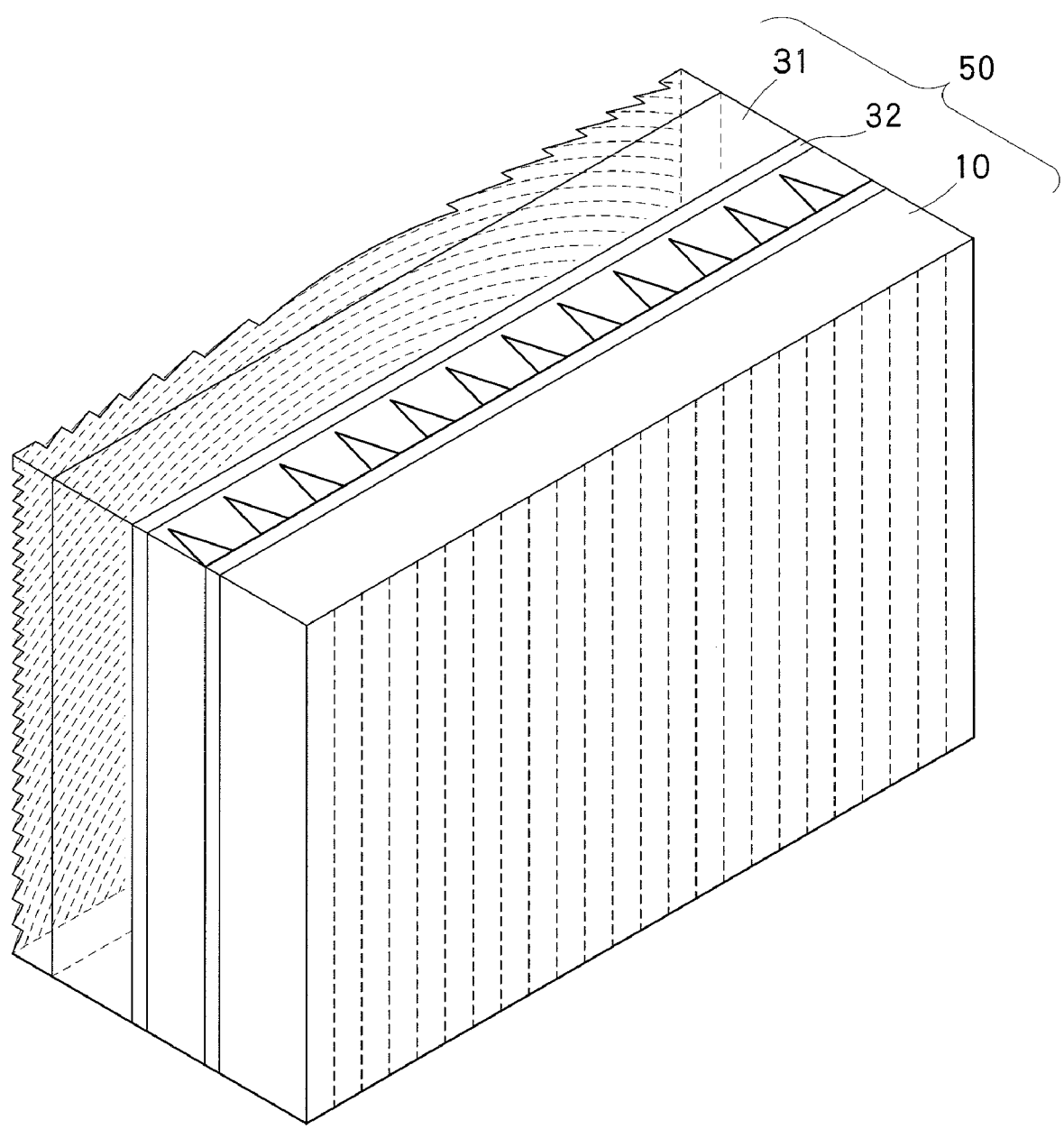
FIG. 5 is a schematic perspective view showing a modification of the transmission type screen shown in FIG. 4.

FIGS. 4 and 5 are schematic perspective views showing two embodiments of a transmission type screen according to the present invention. Transmission type screens 40, 50 shown in FIGS. 4 and 5, respectively, comprise the light-diffusing member 10 of the above-described embodiment. Specifically, a transmission type screen 40, 50 comprises, on the imaging-light-source side, a Fresnel lens member 30, 31 for deflecting light from a light source to nearly perpendicular to the sheet plane of the transmission type screen 40, 50, and, on the observer side (light-outgoing side), the light-diffusing member 10 for controlling the viewing angle by diffusing the deflected nearly parallel light.

More specifically, the transmission type screen 40 shown in FIG. 4 comprises a refraction-type circular Fresnel lens member 30 having the Fresnel center in the sheet plane, and the light-diffusing member 10 that has the light-diffusing part 12 in a sheet form, composed of the diffusing-part base 12a having a plurality of grooves tapered down toward the incident side, made on the light-outgoing side in juxtaposition with one another, and light-absorbing parts 12b formed in the grooves 15 in the diffusing-part base 12a by a radiation-curing resin composition including the colored particles 26.

On the other hand, the transmission type screen 50 shown in FIG. 5 comprises a total-reflection-type circular Fresnel lens member 31 whose Fresnel center is not in the sheet plane, and the light-diffusing member 10 that has the light-diffusing part 12 in a sheet form, composed of the diffusing-part base 12a having a plurality of grooves tapered down toward the incident side, made on the light-outgoing side in juxtaposition with one another, and the light-absorbing parts 12b formed in the grooves 15 in the diffusing-part base 12a by a radiation-curing resin composition including the colored particles 26. In the transmission type screen 50 shown in FIG. 5, the Fresnel lens member 31 and the light-diffusing member 10 are laminated with an adhesive layer 32. In the case where the total-reflection-type circular Fresnel lens member 31 is used, the Fresnel lens member 31 may also be placed so that the Fresnel lens member 31 faces the substrate 11 of the light-diffusing member 10, without laminating the Fresnel lens member 31 to the light-diffusing member 10 (without using an adhesive layer).

It is preferred that the Fresnel lens members 30, 31 for use in the transmission type screens 40, 50 have unit lenses with fine pitches so as to meet the recent trend toward the use of single light sources. In order to make the Fresnel lens members, there can be favorably used the same radiation-curing resin compositions as the ones useful in producing the above-described light-diffusing member 10, specifically radiation-curing resin compositions prepared by adding radiation-curing monomers serving as reactive diluents and photopolymerization initiators to radiation-curing prepolymers such as urethane (meth)acrylate, polyester (meth)acrylate, and epoxy (meth)acrylate.

Such Fresnel lens members 30, 31 can be obtained in the following manner, for example. First, the above-described radiation-curing resin composition is cast upon a form for making a Fresnel lens, and a substrate film is laid over the cast radiation-curing resin composition. Thereafter, radiation (for example, ultraviolet light, electron beam, or the like) is applied to the radiation-curing resin composition through the substrate film so as to cure the composition. The cured radiation-curing resin composition is then separated from the form, thereby obtaining a Fresnel lens member in a sheet from.

According to the transmission type screens 40, 50 of this embodiment, since the screens comprise the above-described light-diffusing member 10, it is possible to reduce non-uniformity in stripes to be observed on the screens. The transmission type screens 40, 50 can therefore be favorably used especially in rear-projection-type displays using single light sources, capable of sharply displaying still images and letters.

<Rear-Projection-Type Display>

Figure 6:
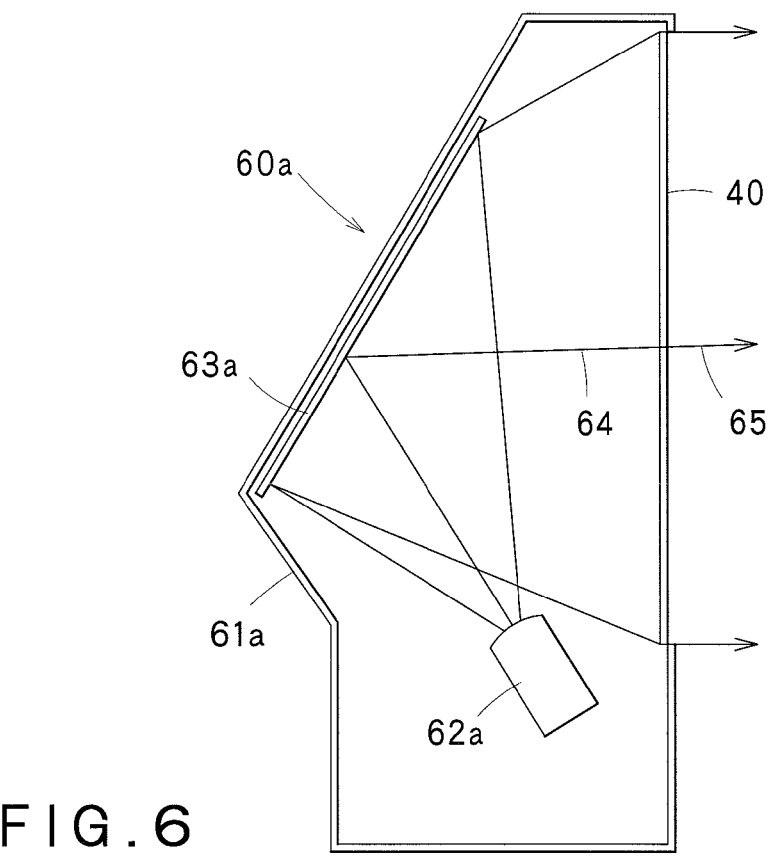
FIG. 6 is a structural view showing a rear-projection-type display comprising the transmission type screen shown in FIG. 4, one embodiment of a rear-projection-type display according to the present invention.
Figure 7:
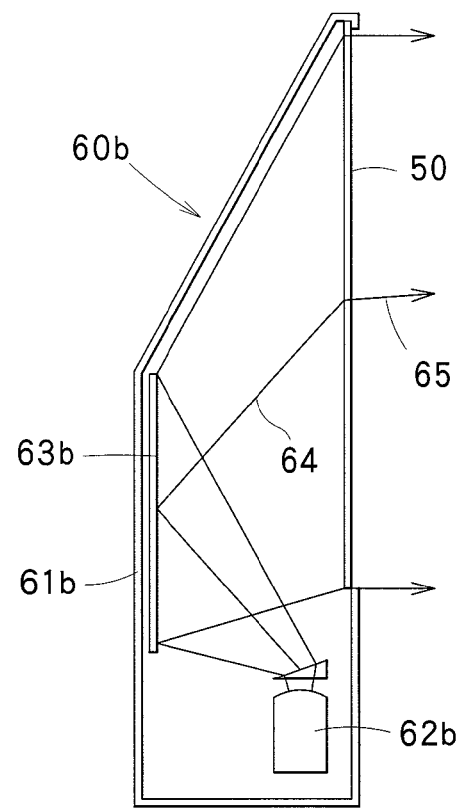
FIG. 7 is a structural view showing a rear-projection-type display comprising the transmission type screen shown in FIG. 5, a modification of the rear-projection-type display shown in FIG. 6.
Figure 9:
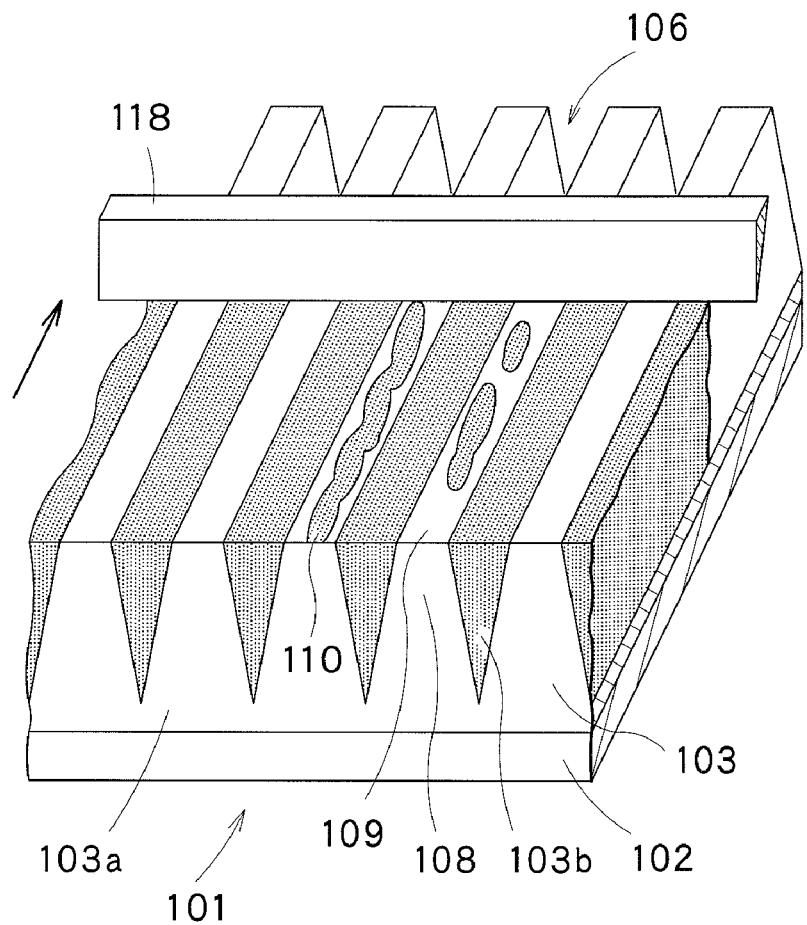
FIG. 9 is a perspective view for explaining a covering.
Figure 10:
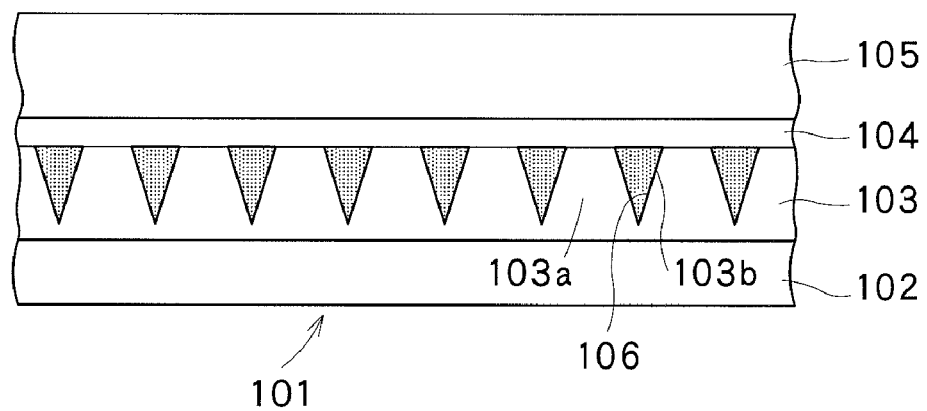
FIG. 10 is a schematic sectional view showing one example of a total-reflection-type lenticular lens member.

FIGS. 6 and 7 are schematic structural views showing two embodiments of rear-projection-type displays 60*a*, 60*b* according to the present invention. The rear-projection-type display 60*a* shown in FIG. 6 comprises a transmission type screen 40 having a circular Fresnel lens member 30 whose Fresnel lens center exists in the sheet plane, that is to say, the above-described transmission type screen 40 shown in FIG. 4. On the other hand, the rear-projection-type display 60*b* shown in FIG. 7 comprises a transmission type screen 31 having a total-reflection-type circular Fresnel lens whose Fresnel lens center exists outside the sheet plane, that is to say, the above-described transmission type screen 50 shown in FIG. 5.

The rear-projection-type display 60*a*, 60*b* has, in its window section on the front side, the transmission type screen 40, 50 having, as a component part, the above-described light-diffusing member 10. In these rear-projection-type display 60*a*, 60*b*, a light source 62*a*, 62*b* is placed on the bottom of a relatively flat body 61*a*, 61*b*, and a mirror 63*a*, 63*b* for reflecting, toward the transmission type screen 40, 50, light from the light source 62*a*, 62*b* is attached to the inner surface of the rear wall of the body 61*a*, 61*b*. The light source 62*a*, 62*b* is a single light source of single tube type, using an LCD (Liquid Crystal Display) or DLP (Digital Light Processing). According to such rear-projection-type displays 60*a*, 60*b*, since the displays comprise, as a component part, the above-described light-diffusing member 10, they can sharply display images, without visual defects, on the transmission type screens 40, 50.

EXAMPLES

The present invention will now be explained more specifically by way of Examples and Comparative Example.

Example 1

A forming roll capable of making, with a pitch of 70 μm, grooves 15 having an opening width of 28 μm and a depth of 120 μm was prepared. A PET film with a thickness of 188 μm was fed between this forming roll and a nip roll. An ultraviolet-curing epoxy acrylate resin composition was supplied between the forming roll and the PET film from a supply system, while feeding the PET film, and was spread on the PET film by the pressing force of the forming roll and the nip roll. Subsequently, ultraviolet light was applied to the ultraviolet-curing resin composition from the PET film side so as to cure the resin composition. There was thus obtained a diffusing-part base including unit lens parts formed by the cured ultraviolet-curing resin composition.

Next, the intermediate member composed of the cured ultraviolet-curing resin composition and the PET film was separated from the forming roll. A colored-particle-including ultraviolet-curing resin composition having the following formulation was then supplied onto the intermediate member from a supply system. The resin composition supplied onto the intermediate member was scraped off with a doctor so as to fill, with the resin composition, the nearly V-shaped grooves in the intermediate member. Ultraviolet light was then applied to the ultraviolet-curing resin composition from the PET film side so as to cure the resin composition, thereby forming light-absorbing parts. Thus, there was obtained a light-diffusing part having the diffusing-part base and the light-absorbing parts, supported by the substrate.

Further, an adhesive-layer-forming ultraviolet-curing resin composition was applied to the light-diffusing part, and a supporting plate was placed on the ultraviolet-curing resin composition applied. Ultraviolet light was then radiated to the resin composition through the supporting plate, thereby laminating the supporting plate and the light-diffusing part through an adhesive layer with a thickness of 70 μm. There was thus produced a light-diffusing member of Example 1.

The supporting plate was a sheet with a thickness of 2 mm, obtained by extruding a resin composition containing an MS (methacryl-styrene) resin and approximately 1 to 2% by weight of a light-diffusing agent. The light-diffusing agents were MS resin particles with a mean particle diameter of approximately 10 μm. Further, an acrylic-resin-made hard coat layer with a thickness of about 10 μm, having antistatic properties, was formed by a coating method on the observer-side (light-outgoing-side) surface of the supporting plate.

<Colored-Particle-Including, Ultraviolet-Curing Resin Composition A>

Photopolymerizable components: urethane acrylate (33.6% by weight), epoxy acrylate (14.4% by weight), tripropylene glycol diacrylate (28% by weight), and methoxytriethylene glycol acrylate (4% by weight) Photopolymerization initiator: Irgacure 184 (4.0% by weight)

Colored particles A: carbon-black-including, crosslinkable, acrylic fine particles (manufactured by Ganz Chemical Co., Ltd., Japan, mean particle diameter: 6.7 μm, 16% by weight, the ratio of particles with particle diameters of 3.0 μm or less included in the composition relative to the composition: 0.27% by weight)

Viscosity at 25° C.: 9,000 mPa·s

Example 2

A light-diffusing member of Example 2 was produced in the same manner as in Example 1, except that the colored particles included in the colored-particle-including, ultraviolet-curing resin composition used in Example 1 were replaced by the following colored particles.

<Colored-Particle-Including, Ultraviolet-Curing Resin Composition B>

The same photopolymerizable components and photopolymerization initiator as those ones described in Example 1 were used.

Colored particles B: carbon-black-including, crosslinkable, acrylic fine particles (manufactured by Ganz Chemical Co., Ltd., Japan, mean particle diameter: 4.0 μm, 16% by weight, the ratio of particles with particle diameters of 3.0 μm or less included in the composition relative to the composition: 4.7% by weight)

Viscosity at 25° C.: 9,000 mPa·s

Example 3

A light-diffusing member of Example 3 was produced in the same manner as in Example 1, except that the colored particles included in the colored-particle-including, ultraviolet-curing resin composition used in Example 1 were replaced by the following colored particles.

<Colored-Particle-Including, Ultraviolet-Curing Resin Composition C>

The same photopolymerizable components and photopolymerization initiator as those ones described in Example 1 were used.

Colored particles C: carbon-black-including, crosslinkable, urethane fine particles (manufactured by Negami Chemical Industry, Co., Ltd., Japan, mean particle diameter:

5.3 μm, 16% by weight, the ratio of particles with particle diameters of 3.0 μm or less included in the composition relative to the composition: 1.79% by weight).

Viscosity at 25° C.: 11,000 mPa·s

Comparative Example 1

A light-diffusing member of Comparative Example 1 was produced in the same manner as in Example 1, except that the colored particles included in the colored-particle-including, ultraviolet-curing resin composition used in Example 1 were replaced by the following colored particles.

<Colored-Particle-Including, Ultraviolet-Curing Resin Composition D>

The same photopolymerizable components and photopolymerization initiator as those ones described in Example 1 were used.

Colored particles D: carbon-black-including, crosslinkable, acrylic fine particles (manufactured by Nippon Shokubai Co., Ltd., Japan, mean particle diameter: 3.3 μm, 16% by weight, the ratio of particles with particle diameters of 3.0 μm or less included in the composition relative to the composition: 7.95% by weight).

Viscosity at 25° C.: 14,000 mPa·s (Evaluation)

In the course of the production of the light-diffusing members of Examples 1 to 3 and Comparative Example 1, when the colored-particle-including, ultraviolet-curing resin composition was supplied from the supply system to the intermediate member separated from the forming roll, and the excess resin composition was scraped off with the doctor so as to fill the nearly V-shaped grooves (pitch: 70 μm, opening width: 28 μm, depth: 120 μm) with the resin composition, observations were made as to whether covering occurs or not. The results of the observations are shown in Table 1, in which the symbol "○" means that no covering occurred, and the symbol "X" means that covering occurred.

TABLE 1

|  | Example 1 | Example 2 | Example 3 | Comparative Example 1 |
|---|---|---|---|---|
| Urethane acrylate (wt. %) | 33.6 | 33.6 | 33.6 | 33.6 |
| Epoxy acrylate (wt. %) | 14.4 | 14.4 | 14.4 | 14.4 |
| Tripropylene glycol diacrylate (wt. %) | 28 | 28 | 28 | 28 |
| Methoxytriethylene glycol acrylate (wt. %) | 4 | 4 | 4 | 4 |
| Colored particles A (wt. %) | 16 | | | |
| Colored particles B (wt. %) | | 16 | | |
| Colored particles C (wt. %) | | | 16 | |
| Colored particles D (wt. %) | | | | 16 |
| Irgacure 184 (wt. %) | 1.3 | 1.3 | 1.3 | 1.3 |
| Esacure KTO46 (wt. %) | 2.7 | 2.7 | 2.7 | 2.7 |
| Total (wt. %) | 100 | 100 | 100 | 100 |
| Ratio of colored particles with particle diameters of 3 μm or less (wt. %) | 0.27 | 4.7 | 1.79 | 7.95 |
| Viscosity (mPa·s/25° C.) | 9000 | 9000 | 11000 | 14000 |
| Covering | ○ | ○ | ○ | X |

TABLE 1-continued

| Colored Particles | | Particle size distribution of colored particles | | |
|---|---|---|---|---|
| Type | Material | Median diameter (μm) | Mean diameter (μm) | 3 μm or less (wt. %) |
| Colored particles A | Carbon-black-including, acrylic resin composition | 6.3 | 6.7 | 1.7 |
| Colored particles B | Carbon-black-including, acrylic resin composition | 3.7 | 4.0 | 29.4 |
| Colored particles C | Carbon-black-including, urethane resin composition | 4.9 | 5.3 | 11.2 |
| Colored particles D | Carbon-black-including, acrylic resin composition | 3.0 | 3.3 | 49.7 |

The invention claimed is:

1. A light-diffusing member for diffusing at least a part of transmitted light by totally reflecting it, comprising:
a light-diffusing part that has a diffusing-part base having a plurality of grooves formed on the light-outgoing side and tapered down toward the incident side, and light-absorbing parts formed, in the grooves in the diffusing-part base, by a radiation-curing resin composition,
wherein the radiation-curing resin composition includes colored particles having a mean particle diameter of 3.5 μm or more and 20 μm or less, and
wherein a ratio of colored particles with particle diameters of 3.0 μm or less included in the radiation-curing resin composition relative to the radiation-curing resin composition is 7.0% by weight or less.

2. The light-diffusing member according to claim 1, wherein the colored particles are acrylic or urethane crosslinkable fine particles containing carbon black.

3. The light-diffusing member according to claim 1, wherein the viscosity of the radiation-curing resin composition at 25° C. is 500 mPa·s or more and 100,000 mPa·s or less.

4. The light-diffusing member according to claim 1, further comprising a substrate placed on the incident side of the light-diffusing part.

5. The light-diffusing member according to claim 1, further comprising a supporting plate laminated to the light-diffusing part.

6. A transmission type screen comprising the light-diffusing member set forth in claim 1.

7. The transmission type screen according to claim 6, wherein the colored particles are acrylic or urethane crosslinkable fine particles containing carbon black.

8. The transmission type screen according to claim 6, wherein the viscosity of the radiation-curing resin composition at 25° C. is 500 mPa·s or more and 100,000 mPa·s or less.

9. The transmission type screen according to claim 6, wherein the light-diffusing member further comprises a substrate placed on the incident side of the light-diffusing part.

10. The transmission type screen according to claim 9, further comprising a refraction-type Fresnel lens member placed so that it faces the substrate of the light-diffusing member.

11. The transmission type screen according to claim 9, further comprising a total-reflection-type Fresnel lens member placed so that it faces the substrate of the light-diffusing member, or bonded to the substrate of the light-diffusing member.

12. The transmission type screen according to claim 6, wherein the light-diffusing member further comprises a supporting plate laminated to the light-diffusing part.

13. A rear-projection-type display comprising the transmission type screen set forth in claim 6.

14. A light-absorbing-part-forming resin composition that is a radiation-curing resin composition to be applied to a member in a sheet form, having a plurality of grooves, and scraped off with a doctor blade into the grooves so as to form therein light-absorbing parts, the resin composition comprising colored particles with a mean particle diameter of 3.5 μm or more and 20 μm or less, wherein a ratio of colored particles with particle diameters of 3.0 μm or less included in the whole composition relative to the whole composition is 7.0% by weight or less.

15. The light-absorbing-part-forming resin composition according to claim 14, wherein the colored particles are acrylic or urethane crosslinkable fine particles containing carbon black.

16. The light-absorbing-part-forming resin composition according to claim 14, having a viscosity at 25° C. is 500 mPa·s or more and 100,000 mPa·s or less.

* * * * *